United States Patent
Cofler et al.

(10) Patent No.: US 6,889,313 B1
(45) Date of Patent: May 3, 2005

(54) SELECTION OF DECODER OUTPUT FROM TWO DIFFERENT LENGTH INSTRUCTION DECODERS

(75) Inventors: Andrew Cofler, Voreppe (FR);
Stéphane Bouvier, Saint Ismier (FR);
Laurent Wojcieszak, Meylan (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,634

(22) Filed: May 2, 2000

(30) Foreign Application Priority Data

May 3, 1999 (EP) .......................... 99410049

(51) Int. Cl.[7] .............................. G06F 9/30
(52) U.S. Cl. ................. 712/212; 712/43; 712/210
(58) Field of Search ................. 712/43, 210, 212, 712/229

(56) References Cited

U.S. PATENT DOCUMENTS

| | | | |
|---|---|---|---|
| 3,566,366 A | 2/1971 | Quinn et al. | ................. 712/210 |
| 5,809,273 A | * 9/1998 | Favor et al. | ................. 712/210 |
| 5,854,913 A | * 12/1998 | Goetz et al. | ................. 712/210 |
| 5,884,057 A | 3/1999 | Blomgren et al. | ......... 712/204 |
| 6,324,639 B1 | * 11/2001 | Heishi et al. | ............... 712/212 |

FOREIGN PATENT DOCUMENTS

| | | |
|---|---|---|
| GB | 1 442 459 | 7/1976 |
| GB | 2 289 353 | 11/1995 |
| WO | WO 99/14669 | 3/1999 |

OTHER PUBLICATIONS

"What's the Difference Between RISC and CISC?".

* cited by examiner

Primary Examiner—Kenneth S. Kim
(74) Attorney, Agent, or Firm—Lisa K. Jorgenson; James H. Morris; Wolf, Greenfield & Sacks, P.C.

(57) ABSTRACT

A decode unit comprises first and second decoders respectively connected to receive bit sequences of first and second predetermined lengths. The first and second decoders operate in parallel to generate respective outputs. A switch selects one of the outputs in dependence on an instruction mode of the processor which governs the length of the bit sequence which is actually required to be decoded.

18 Claims, 4 Drawing Sheets

SELECTION OF DECODER OUTPUT FROM TWO DIFFERENT LENGTH INSTRUCTION DECODERS

FIELD TO THE INVENTION

The present invention relates to decoding instructions in a computer system such as a processor.

BACKGROUND TO THE INVENTION

In a computer system, instructions are typically fetched from a program memory, decoded and supplied to an execution unit where they are executed to run the program stored in the program memory. It is advantageous for such a computer system to be able to support more than one instruction mode. A novel computer system described herein can support three instruction modes.

According to a first instruction mode, during each machine cycle a pair of 16 bit instructions are decoded.

According to a second instruction mode, during each machine cycle two 32 bit instructions are decoded.

According to a third instruction mode, four 32 bit instructions are decoded during each machine cycle.

In practice, a prefetch unit fetches a word from memory having a length of 128 bits. This word can contain eight 16 bit instructions (GP16 mode), four independent 32 bit instructions (GP32) or four interrelated 32 bit instructions (VLIW mode). The four 32 bit instructions in VLIW mode are interrelated in the sense that they have to conform to a certain grammar such that they can be fetched and supplied to the decoder together. The prefetch unit supplies an 128 bit sequence to the decode unit on each machine cycle. However, the decode units should supply to the execution unit decoded outputs only for the instructions to be decoded in that machine cycle.

The aim of the present invention is to provide a decode unit which is simple and power efficient, which can nevertheless accurately supply decoded outputs to the execution unit in accordance with the instruction mode of the computer.

SUMMARY OF THE INVENTION

According to one aspect of the present invention there is provided a decode unit for decoding instructions in a processor each instruction comprising a bit sequence having a length depending on an instruction mode of the processor, the decode unit comprising: a first decoder having an input connected to receive a bit sequence of a first predetermined length and operating on receipt of said bit sequence to generate a first decoded output; a second decoder having an input connected to receive a bit sequence of a second predetermined length and operating on receipt of said bit sequence to generate a second decoded output; a communication path for supplying a bit sequence simultaneously to said first and second decoders; and switching circuitry responsive to an instruction mode signal to select one of the first and second outputs in dependence on the instruction mode of the processor.

Thus, as described in the following, in order to manage different instruction modes, the decode unit has a plurality of dedicated decoders each of which receives and decodes the bit sequence during each machine cycle. Depending on the instruction mode of the machine, the outputs of selected one of the decoders are supplied to the execution unit for execution. The outputs of the other decoder are not required and thus are not selected.

Another aspect of the present invention provides a processor comprising: at least one execution unit for executing instructions; an instruction mode indicator which indicates one of a plurality of instruction modes for the processor; a decode unit for decoding instructions prior to dispatch to the at least one execution unit; and an instruction supply mechanism for supplying instructions to the decode unit, wherein each instruction is represented by bit sequences the length of which depends on an instruction mode of the processor, and wherein the decode unit comprises: a first decoder having an input connected to receive a bit sequence of a first predetermined length and operating on receipt of said bit sequence to generate a first decoded output; a second decoder having an input connected to receive a bit sequence of a second predetermined length and operating on receipt of said bit sequence to generate a second decoded output; a communication path for supplying a bit sequence simultaneously to said first and second decoders; and switching circuitry responsive to an instruction mode signal to select one of the first and second outputs in dependence on the instruction mode of the processor.

A further aspect of the present invention provides a method of decoding instructions in a processor, each instruction comprising a bit sequence having a length depending on an instruction mode of the processor, the method comprising: decoding a bit sequence of a first predetermined length and generating a first decoded output; simultaneously decoding a bit sequence of a second predetermined length and generating a second decoded output; and selecting one of the first and second decoded outputs responsive to an instruction mode signal indicating the instruction mode of the processor.

The arrangement described herein has the advantage that the decode unit can be implemented with decoders which are simple combinatorial logic.

For a better understanding of the present invention and to show how the same may be carried into effect reference will now be made by way of example to the accompanying drawings.

DESCRIPTION OF THE PREFERRED EMBODIMENT

Figure 1:
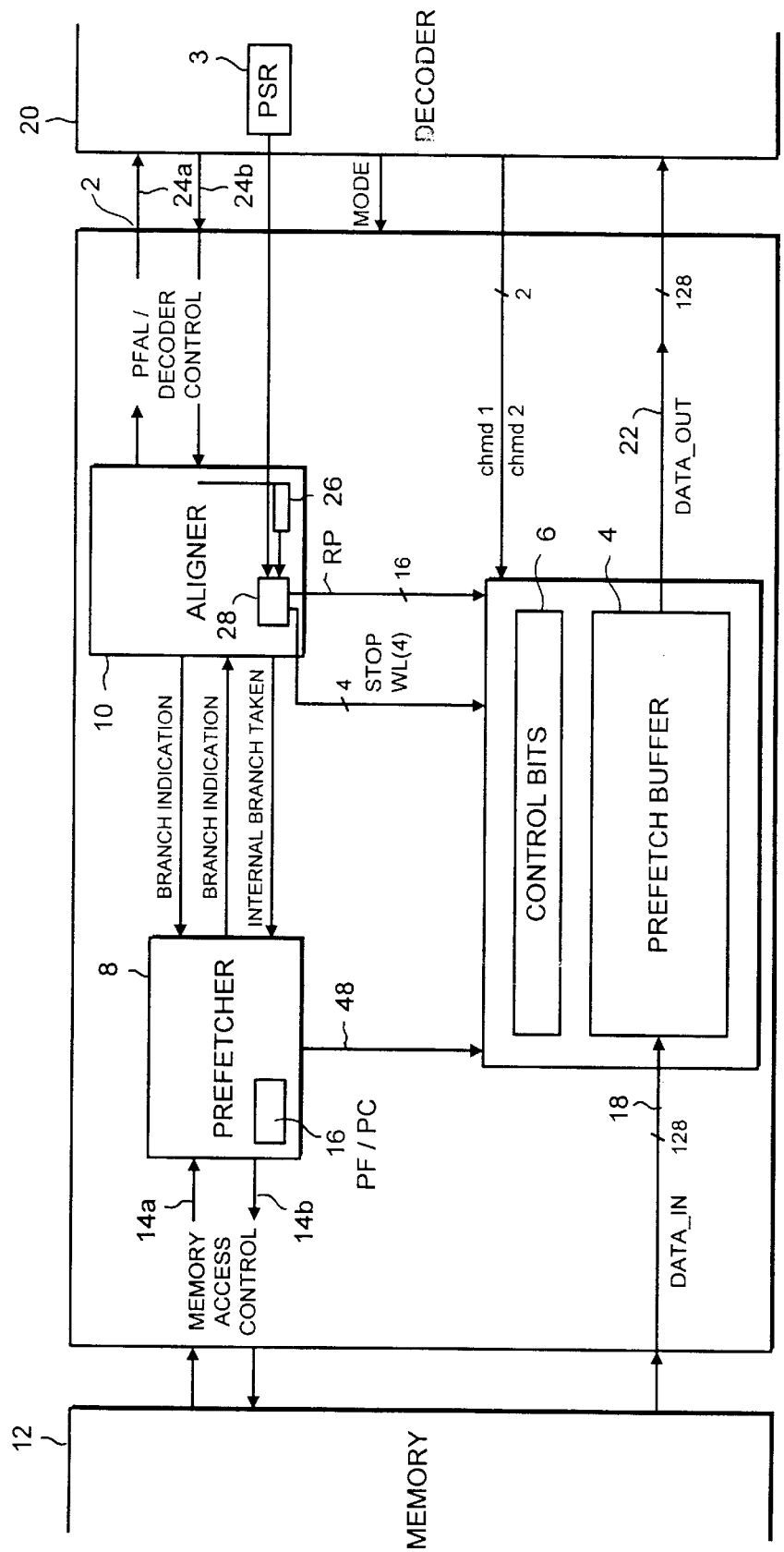
FIG. 1 is a block diagram of a prefetch unit.

FIG. 1 is a block diagram of a prefetch unit 2 for a processor, the prefetch unit 2 comprising a prefetch buffer 4 with associated control bits 6 and control circuitry comprising a prefetcher 8 and an aligner 10. The prefetcher 8 is connected to a program memory 12 and is responsible for initiating memory accesses to the program memory 12 using memory access control signals 14a,14b. The address in memory to which a fetch is initiated is held in a prefetch program counter 16 in the prefetcher 8. Control of the prefetch program counter is not discussed herein, but it can be assumed that fetches are initiated from memory in accordance with a sequence of instructions to be executed by the processor. That is, the prefetch program counter may be incremented each time as a sequence of adjacent instructions is fetched, or it may change according to branches, traps, interrupts etc. Responsive to a memory fetch initiated by the prefetcher, instruction words are supplied from the program memory 12 to the prefetch buffer 4 as represented by data in path 18.

The aligner 10 controls reading of instructions from the prefetch buffer to a decode unit 20 along data-out path 22.

To do this, the aligner issues and is responsive to prefetcher align (PFAL)/decoder control signals 24a,24b. The aligner 10 has an align program counter 26 which keeps track of how many instructions have been dispatched to the decoder 20 in each machine cycle, and a state machine 28 which generates a read pointer RP for controlling the prefetch buffer in a manner which is described in more detail hereinafter.

Figure 2:
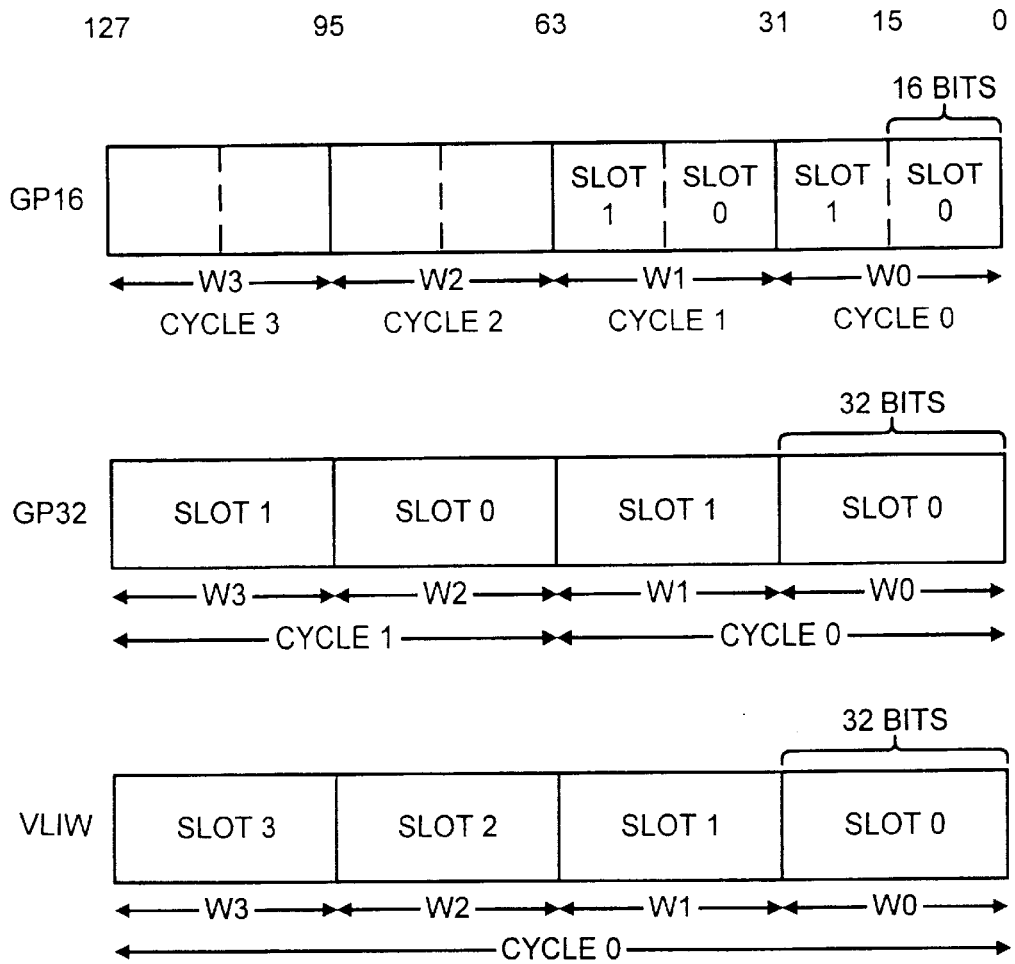
FIG. 2 illustrates the different instruction modes of the processor.

Instructions in the program memory 12 can have a length of 16 bits or 32 bits. The prefetch buffer supports three different instruction modes as described with reference to FIG. 2 as follows. The instruction mode is held in a process status register (PSR) 3 at the decode unit 20 and can be changed. Change mode signals chmd1,chmd2 are issued by the decoder 20 responsive to a change in instruction mode.

According to a first instruction mode, a pair of 16 bit instructions are supplied during each machine cycle to the decoder 20 from the prefetch buffer 4. This pair is denoted slot0,slot1 in bit sequences w0,w1 etc. This is referred to herein as GP16 mode.

According to a second instruction mode, two instructions each having a length of 32 bits are supplied to the decoder from the prefetch buffer in each machine cycle, for example w0,w1 in CYCLE 0. This mode is referred to herein as GP32 mode.

According to a third instruction mode, four instructions w0,w1,w2,w3 each of 32 bits in length are supplied to the decoder in each machine cycle. This is referred to herein as VLIW.

In all modes, each fetch operation initiated to the program memory 12 retrieves an instruction word of 128 bits in length. Thus, in GP16 mode, the instruction word comprises eight 16 bit instructions, paired as slot0,slot1 for each machine cycle. In GP32 and VLIW mode, the instruction word comprises four 32 bit instructions.

Figure 3:
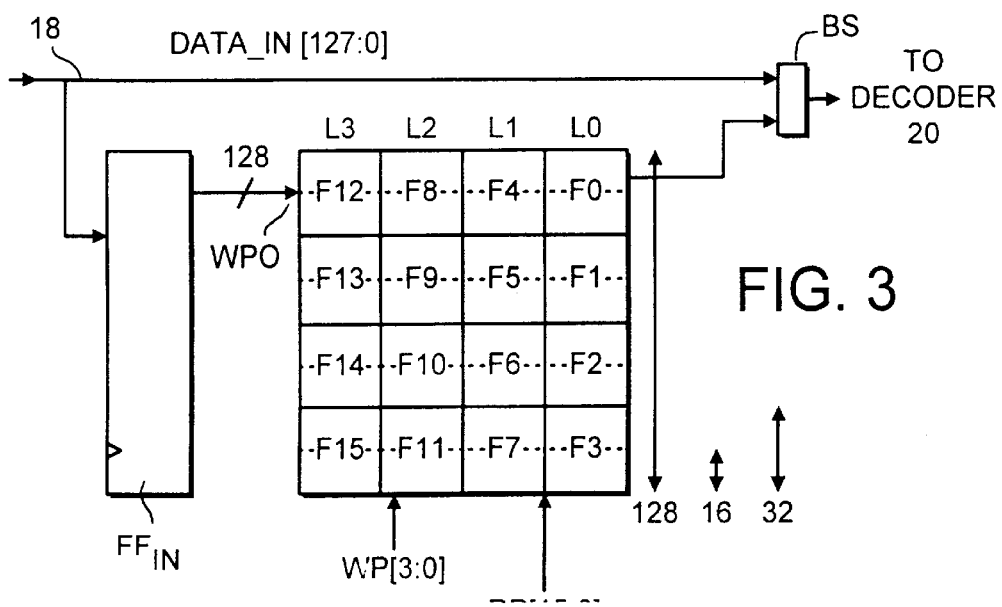
FIG. 3 illustrates the organisation of a prefetch buffer.

The organisation of the prefetch buffer 4 is illustrated in FIG. 3. In diagrammatic terms, the prefetch buffer can be considered to have four successive lines L0 to L3, each having a capacity of 128 bits. There is a single write port WPO having a width of 128 bits which receives data from the program memory via the data-in path 18 and an input latch FF-in and writes it into the selected line under the control of a write pointer WP[3:0]. Each line comprises four storage locations each having a capacity of 32 bits and each of which is shown diagrammatically divided into two 16 bit sections for the purposes of explanation. The storage locations are denoted F0 to F15. Each line in FIG. 3 is referred to herein as a group of storage locations and has the capacity for one 128 bit line from memory. This allows up to four successive memory accesses to be made, even if the first instruction word has not been received or executed by the processor. While the instruction word in storage locations F0 to F3 is being decoded and subsequently executed, memory fetches can continue to be implemented into the storage locations F4 to F7, F8 to F11 and F12 to F15 until the buffer is full. By the time that a memory fetch has been made into the last group F12 to F15, it is most likely that the first group F0 to F3 will have been completely read out into the decode unit and will thus be ready to receive a subsequent instruction word from memory. The number of cycles required to decode an instruction word in each group varies depending on the instruction mode of the machine in a manner which will be described in more detail in the following. Nevertheless, a minimum of one cycle is required for reading and decoding, and therefore the use of the prefetch buffer hides memory latency.

In order to save a cycle when the prefetch buffer is empty or flushed after a branch, data can bypass the prefetch buffer through a bypass circuitry BS. As described in more detail later, the bypass circuitry is implemented as a plurality of multiplexors (MUX0 to MUX3 in FIG. 4).

Figure 4:
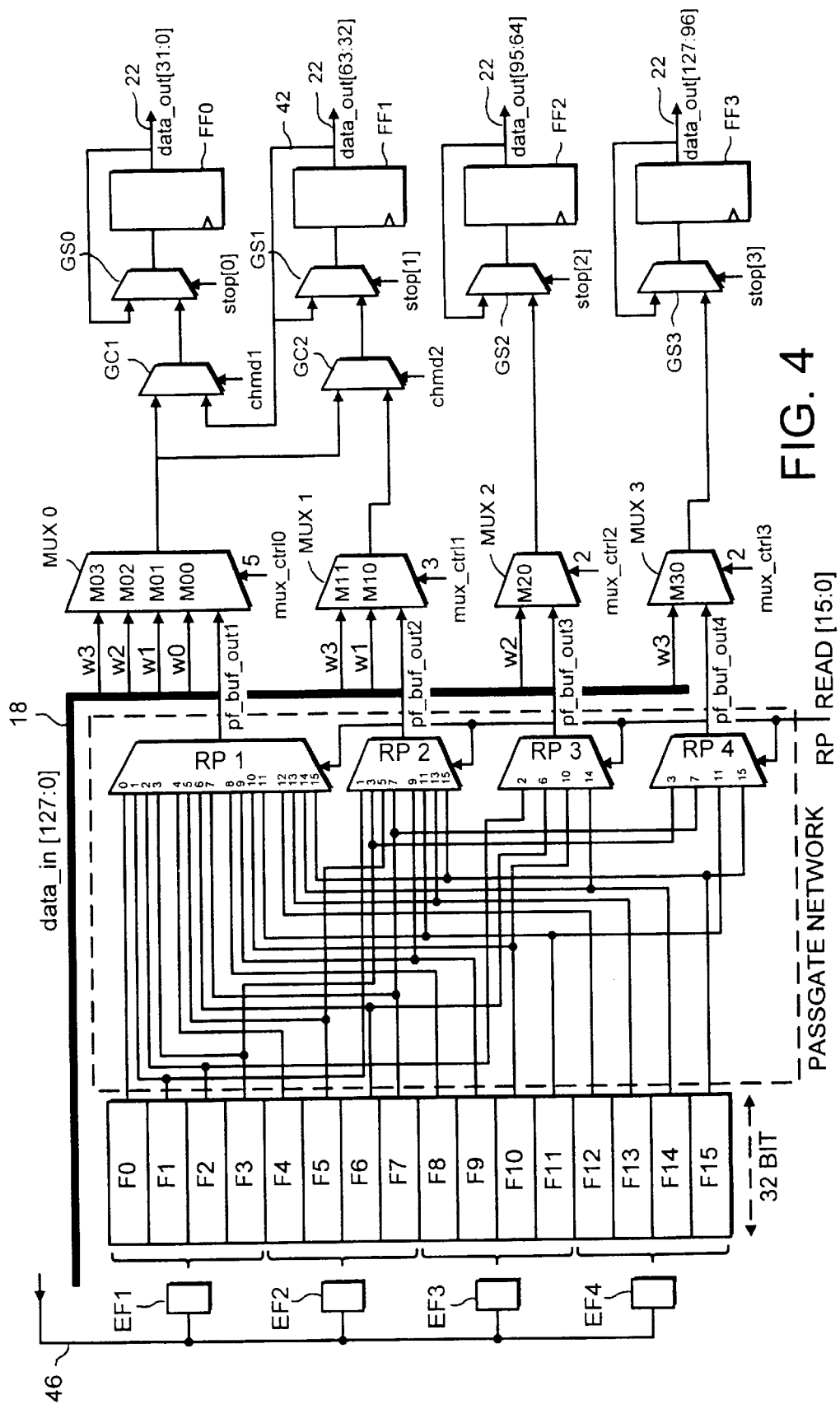
FIG. 4 is a circuit diagram illustrating the key components of the prefetch buffer.

FIG. 4 is a more detailed diagram of the prefetch buffer and its associated read circuitry. The storage locations F0 to F15 are illustrated aligned vertically for the purposes of explanation.

The control bits 6 described above in FIG. 1 include empty flags EF1 to EF4 which indicate when a complete 128 bit line of storage locations is empty such that a subsequent memory fetch can be initiated. When a fetch is instituted from memory, and data has been received by the prefetch buffer, the empty flag is cleared to indicate that those storage locations are now full.

Reading from the prefetch buffer will now be described with reference to the schematic diagram of FIG. 4. The prefetch buffer includes four read ports RP1,RP2,RP3 and RP4. These read ports each take the form of multiplexors each capable of connecting selected ones of the storage locations F0 to F15 to a 32 bit output, pf-buf-out1,2,3 or 4. However, the read ports are not identical. The first read port RP1 has sixteen inputs each of which is connected to a respective storage location F0 to F15 and each of which can be connected to the output pf-buf-out1. The second read port RP2 has eight inputs which are respectively connected to storage locations F1,F3,F5,F7,F9,F11,F13,F15 to selectively connect the contents of those storage locations to the output pf-buf-out2.

The third read port RP3 has four inputs connected to storage locations F2,F6,F10 and F14 for selectively connecting the contents of those storage locations to the output pf-buf-out3. The fourth read port RP4 also has four inputs which are connected to storage locations F3,F7,F11 and F15 for selectively connecting the contents of those storage locations to the output pf-buf-out4.

The read ports RP1 to RP4 are controlled by the read pointer RP from the aligner 10 in dependence on the instruction mode of the machine and the consequential number of machine cycles required for decoding each instruction word.

Alternatively, for instructions supplied directly from memory along data-in path 18, the control of instructions supplied to the decoder in dependence on the instruction mode and machine cycles is additionally controllable by multiplexors MUX0,MUX1,MUX2 and MUX3. These receive at their input respective bits of the 128 bit data-in path 18 to supply a 32 bit sequence to each multiplexor in each machine cycle as described in the following.

The selection of which instructions within the instruction word are supplied to the decode unit 20 is made on dependence on the instruction mode as described in the following. In FIG. 3, the symbols w0 to w3 are used on different input lines of the multiplexors MUX0 to MUX3 to represent different 32 bit sequences, as in FIG. 4. The definition of each 32 bit sequence depends on the instruction mode, but bits of the data-in path are always allocated as w0 [0:31], w1 [32:63], w2 [64:95], w3 [96:127]. The inputs to the multiplexors are individually labelled so as to distinguish between them. That is, in GP16 mode, on the first decode cycle, cycle 0, the first sequence w0 is supplied to the decoder 20. This presents a pair of 16 bit instructions, slot0,slot1 (w0) for simultaneous decoding by the decode unit 20. On the next cycle, cycle 1, the sequence w1 is supplied, presenting the next pair of 16 bit instructions slot0,slot1 (w1) for decoding. In GP16 mode, the read port RP1 and the multiplexor MUX0 are the only read devices which are used and the control of the word which is supplied to the decode unit is made by the multiplexor MUX0 under the control of signal mux-ctrl0, and the read pointer RP. If the signal mux-ctrl0 selects the read port output pf-buf-out1, the read pointer selects inputs F0 to F3 over four successive cycles CYCLE0 to CYCLE3 to read out successively w0 to w4. Once storage location F3 has been read out, the read port counter will reset the read port RP1 so that it reads out from storage locations F4 to F7 over the next four cycles. If the buffer is not in use, the first instruction pair w0 is read out by the multiplexor MUX0. That is in cycle 0, input M00 of the multiplexor MUX0 is selected. Meanwhile, the 128 bit line is loaded into the first location of the prefetch buffer and the read pointer points to the next location to be read out by the decode unit. Therefore on cycle 1, the next instruction pair w1 is read out by the multiplexor MUX0 by selecting pf-buf-out1

In GP32 mode, in the first machine cycle the first two instructions w0,w1 are presented to the decode unit 20. In the subsequent cycle, cycle 1, the next two instructions w2,w3 are presented to the decode unit. This utilises read ports RP1 and RP2 and the multiplexors MUX0 and MUX1. If the signal mux-ctrl0 is set to pf-buf-out1, and mux-ctrl1 to pf-buf-out2, then the read pointer RP is set to F0 for RP1 and F1 for RP2 in cycle 0. In cycle 1, it is changed to F2 and F3 respectively. Instructions are then read over the next two cycles from the next group of storage locations F4 to F7 by altering the setting of the read ports RP1 and RP2 responsive to the read pointer RP. Alternatively, when read from the data-in path 18, in the first cycle, the first input M10 of the multiplexor MUX1 is set to read w1 (bits 31 to 63) and the first input M00 of the multiplexor MUX0 is set to read w0 (bits 0 to 31). Thus, instructions w0 and w1 are presented to the decode unit 20 in CYCLE 0. Meanwhile, the 128 bit line is loaded into the prefetch buffer so that in the subsequent cycle, CYCLE 1, w2 and w3 are read from the buffer by selecting pf-buf-out1 and pf-buf-out2.

In VLIW mode, four 32 bit instructions W0 to W3 (slot0 to slot3) are supplied simultaneously to the decode unit 20 in each machine cycle, e.g. CYCLE 0. The multiplexors MUX2 and MUX3 are set according to the control signals mux-ctrl2 and mux-ctrl3 respectively to allow the instruction words w2 and w3 to be read either from the buffer or from the data-in path 18. In other respects, the settings of RP1 and RP2, MUX0 and MUX1 are as in GP32 mode. However, in the subsequent cycle, e.g. CYCLE 1 in VLIW mode, it will be noticed that the instruction words w2 and w3 which would have been remaining in GP32 mode have now been read out. Therefore, the read pointer RP can immediately move on to the next set of storage locations F4 to F7 to read out the subsequent VLIW instruction word containing the next four instructions.

Data is passed from the multiplexors MUX0 to MUX3 to respective output flip-flops FF0 to FF3 via a set of control gates labelled GC1, GC2 and GS0 to GS3. The control gates GC1,GC2 are responsive to change mode signals chmdl, chmd2 respectively which indicate to the prefetch unit that there has been a change in the instruction mode in which the machine is operating. The control gates GS0 to GS3 are responsive to respective stop signals stop [0]0 to stop [3]0 to prevent any new data from entering the decode unit from that output flip-flop. These effectively allow the decode unit to be stalled. In a stop condition, the outputs of the flip-flops are recirculated to the input of its associated control switch to prevent unnecessary operation of the subsequent decoder. Operation of the prefetch unit responsive to the change mode signals chmdl and chmd2 will now be described. The output flip-flop FF0 is connected to a single 32 bit decoder and to two 16 bit decoders. When the machine is in GP16 mode, the outputs of the two 16 bit decoders are selected for the instruction pair supplied to the flip-flop FF0. When the machine is in GP32 mode, the output of the 32 bit decoder is selected. The remaining flip-flops FF1 to FF3 are each connected to respective 32 bit decoders.

A first change mode signal chmdl signals a change of machine instruction mode from GP32 to GP16. If the machine had been operating in GP32 mode, consider the situation at the end of cycle 0 which reference to FIG. 2. Instructions w0 and w1 will have been supplied via the flip-flops FF0 and FF1 to the respective 32 bit decoders of the decoder 20. However, the change in instruction mode now implies that the 32 bit sequence which was formerly to be considered as the second instruction W1 in cycle 0 of GP32 mode, in fact contains a pair of 16 bit instructions as denoted in cycle 1 of GP16 mode. Thus, the output of the 32 bit decoder connected to the flip-flop FF1 needs to be ignored, and the 32 bit sequence w1 needs to be reapplied to the two 16 bit decoders connected to the output flip-flop F0. This is achieved by the recirculation line 42 from the output of the flip-flop FF1 to the input of the control gate CG1.

Conversely, control signal chmd2 denotes a change of instruction mode from GP16 to GP32. Consider again the effect at the end of cycle 0 with reference to FIG. 2. The instruction pair denoted w0 has just been decoded in GP16 mode, and the expectation is that the machine will now wait for the next instruction pair w1. However, in GP32 mode, that word w1 represents a single instruction and the change mode signal chmd2 allows it to be applied directly through the control gate GC2 to the output flip-flop FF1 so that it can be applied directly to the input of the dedicated 32 bit decoder connected to the output of the flip-flop FF1. This allows the instruction w1 to be decoded as a single 32 bit instruction. In the next cycle, instructions w2 and w3 can be transmitted normally as indicated by cycle 1 in GP32 mode in FIG. 2.

It will be clear from the above that the number of cycles needed to read all four storage locations in a group depends on the instruction mode. That is, in GP16 mode, four cycles are needed, in GP32 two cycles are needed and VLIW one cycle is needed. When all the storage locations F0 to F3 in the first group have been read, the first empty flag EF1 is cleared to empty.

The aligner controls the setting and clearing of the "empty" flags using information from the read pointer. The aligner detects when the read pointer goes from one line (128 bits) to the next. When this occurs, the "empty" flag corresponding to the page which has just been read is set.

The state of an empty flag being cleared is detected by the prefetcher 8 along line 48 and a fetch is initiated to the next prefetch address in the prefetch program counter 16. Thus, the next instruction line is fetched from memory and the write pointer WP is set to write it into storage locations F0 to F3. In the meantime, the read pointer has moved to the second group F4 to F7 to read and decode instructions of that group. When those storage locations are empty, the empty flag EF2 is cleared, a next memory fetch is initiated by the prefetcher 8 and the read pointer moves onto the group F8 to F11. As can readily be seen, the prefetch buffers masks a latency of memory fetches of at least three cycles in the VLIW mode, and a greater number of cycles in GP32 and GP16 mode. Signals are supplied from the decoder along line 24b to the aligner 10 indicating what mode the decoder is operating in so that the aligner can adjust the align program counter 26 accordingly and keep track of the next instructions to be decoded so that the read pointer RP can correctly be issued by the state machine 28. The control signals 24b sent from the decode unit 20 to the aligner include an acknowledge bit which controls the aligner, in particular the program counter 26.

Figure 5:
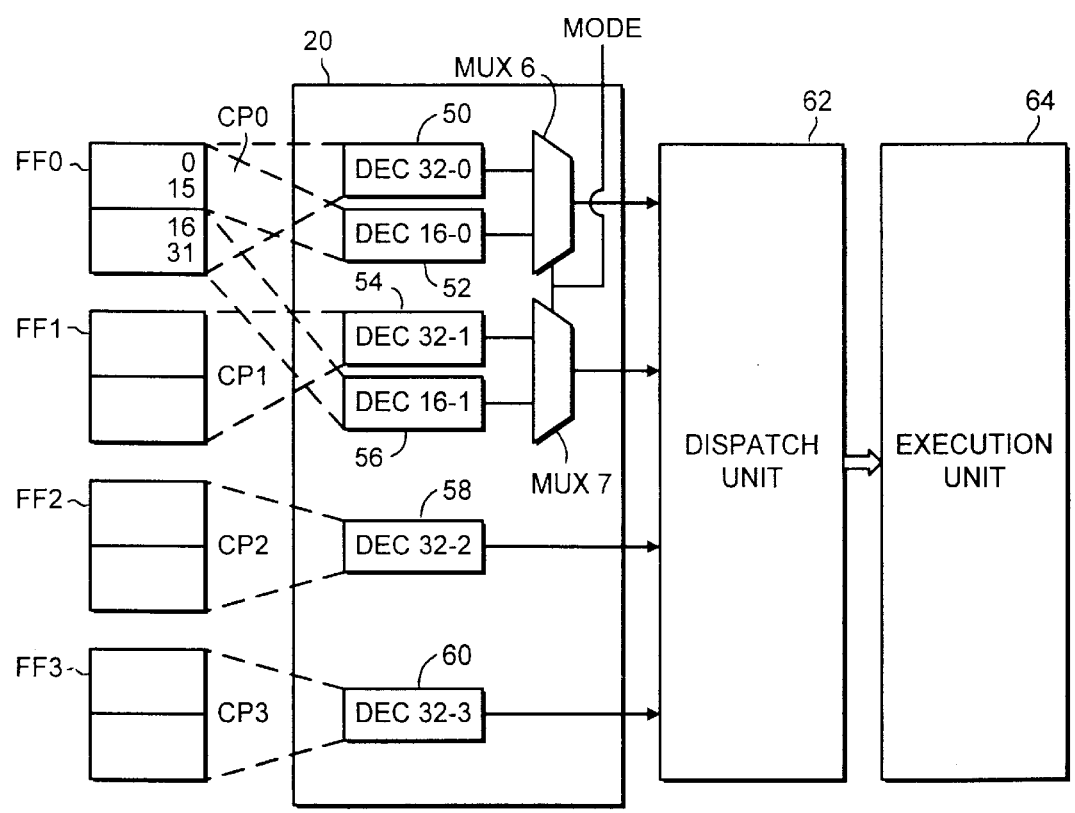
FIG. 5 is a block diagram of a decode unit.

FIG. 5 illustrates the details of the decode unit 20. The decode unit comprises six decoders 50,52,54,56,58 and 60. Four of the decoders 50,54,58 and 60 are 32 bit decoders which are labelled DEC32-0,1,2 and 3 respectively because they are each associated with the output devices FF0 to FF3 of the prefetch buffer illustrated in FIG. 4. There are two 16 bit decoders 52,56 which are labelled DEC16-0,1 respectively. Both of the 16 bit decoders 52,56 are associated with the first output device FF0. The 32 bit decoders 50,54,58 and 60 are hard-wired by 32 bit communication paths respectively to the output devices F0 to F3. These communication paths are denoted by the dotted lines CP0 to CP3 in FIG. 6. The first 16 bit decoder 52 is hard-wired to the 16 least significant bits of the output of the output device FF0, and the second 16 bit decoder 56 is hard-wired to the 16 most significant bits of the output of the output device FF0. Thus, the bits of each instruction are supplied as a parallel sequence to the decoders.

The outputs of the top two decoders 50 and 56 are supplied to a first decode multiplexor MUX6 which has an output connected to an instruction dispatch unit 62. The outputs of the second two decoders 54,56 are connected to a second decode multiplexor MUX7, the output of which is also connected to a dispatch unit 62. The outputs of the lower most decoders 58,60 are connected directly to the dispatch unit 62. The decoders 50 to 60 are always "on". That is, on each machine cycle they receive the bits on the connection paths CP input to the decoders, perform a decode operation and supply an output. It can readily be seen therefore that of the top four decoders, the outputs of only two of them in each case are of interest. For example, in GP32 mode, it is the outputs of the decoders 50,54 which are required—the outputs of the decoders 52,56 being redundant. A mode signal MODE supplied to the multiplexors Mux6,MUx7 selects the appropriate outputs in dependence on the instruction mode of the machine.

Although the decoders are normally "on", they are responsive only to change in state of the bits supplied to them from the output devices FF0 to FF3. If between two machine cycles, there is no change in state in the outputs of the output devices, then the connected decoder will not need to change any of its internal state. Thus, no power will be consumed by that decoder for as long as the outputs of the output device FF0 to FF3 connected to is do not change. Therefore, by recirculating the outputs using the control switches GS0 to GS3 responsive to the stop signals stop [0]0 to stop [3]0 when the relevant decoders are not required, a power saving feature is introduced.

What is claimed is:

1. A decode unit for decoding instructions in a processor each instruction comprising a bit sequence having one of a first or second predetermined length depending on one of a plurality of instruction modes of the processor, the decode unit comprising:

a first decoder having an input connected to receive a first bit sequence of the first predetermined length and operating on receipt of said fist bit sequence to generate a first decoded output;

a second decoder having an input connected to receive a second bit sequence of the second predetermined length different from the first predetermined length and operating on receipt of said second bit sequence to generate a second decoded output;

a communication path for supplying said first bit sequence to the first decoder while simultaneously supplying said second bit sequence to the second decode; and switching circuitry responsive to an instruction mode signal specifying an instruction mode of the plurality of instruction modes, to select one of the first and second decoded outputs in dependence on the specified instruction mode.

2. A decode unit according to claim 1, which comprises a third decoder having an input connected to receive a bit sequence of the second predetermined length and operating on receipt of said bit sequence to generate a third decoded output, wherein the second predetermined length is half the first predetermined length.

3. A decode unit according to claim 2, which comprises a fourth decoder having an input connected to receive a bit sequence of said first predetermined length and operating on receipt of said bit sequence to generate a fourth decoded output, the decode unit further comprising further switching circuitry responsive to the instruction mode signal to select one of the third and fourth outputs in dependence on the specified instruction mode.

4. A decode unit according to claim 2, which comprises an input buffer for holding a bit sequence of the first predetermined length and simultaneously supplying said bit sequence to the first decoder and at least a portion of said bit sequence to the third decoder.

5. A decode unit according to claim 4, further comprising:

a fourth decoder having an input connected to receive a bit sequence of said first predetermined length and operating on receipt of said bit sequence to generate a fourth decoded output, the decode unit further comprising further switching circuitry responsive to the instruction mode signal to select one of said third and fourth decoded outputs in dependence on the specified instruction mode; and a second unit buffer for holding a bit sequence of the first predetermined length and for supplying said bit sequence to the fourth decoder, wherein the switching circuitry and further switching circuitry operate so that the first and fourth decoded outputs are simultaneously selected, or the second and third decoded outputs are simultaneously selected.

6. A decode unit according to claim 1, wherein according to a first one of the plurality of instruction modes, each bit sequence of the first predetermined length has $2n$ bits and comprises two instructions each of bit length $n$.

7. A decode unit according to claim 1, wherein in accordance with a second one of the plurality of instruction modes, two instructions each having a length equal to the first predetermined length are simultaneously decoded.

8. A decode unit according to claim 6, wherein $n$ equals 16.

9. A decode unit according to claim 5, which further comprises fifth and sixth decoders each having an input connected to receive a bit sequence of the first predetermined length and operating on receipt of said bit sequence to generate respectively fifth and sixth decoded outputs.

10. A decode unit according to claim 9, which comprises third and fourth input buffers each holding a bit sequence of the first predetermined length for supplying said bit sequences respectively to the fifth and sixth decode units.

11. A decode unit according to claim 1, wherein four instructions each having a bit length equal to the first predetermined length are simultaneously decoded in accordance with a third one of the plurality of instruction modes.

12. A decode unit according to claim 3, wherein the switching circuitry, and the further switching circuitry, each comprise a multiplexor.

13. The decode unit of claim 1, wherein the second bit sequence is a subset of the first bit sequence.

14. A method of decoding instructions in a processor, each instruction comprising a bit sequence having one of a first or second length depending on one of the plurality of instruction modes of the processor, the method comprising:

decoding a bit sequence of the first predetermined length and generating a first decoded output;

simultaneously decoding a bit sequence of the second predetermined length different than the first predetermined length and generating a second decoded output; and selecting one of the first and second decoded outputs responsive to an instruction mode signal specifying an instruction mode of the plurality of instruction modes.

15. The method of claim 14, wherein the bit sequence of a second predetermined length is a subset of the bit sequence of the first predetermined length.

16. A decode unit for decoding instructions in a processor, the instructions comprising a bit sequence having a length depending on an instruction mode of the processor, the decode unit comprising:

a first decoder having an input connected to receive a bit sequence of a first predetermined length and operating on receipt of said bit sequence to generate a first decoded output;

a second decoder having an input connected to receive a bit sequence of a second predetermined length and operating on receipt of said bit sequence to generate a second decoded output;

a communication path for supplying a bit sequence simultaneously to said first and second decoders; and switching circuitry, responsive to an instruction mode signal, to select one of the first and second outputs in dependence on the instruction mode of the processor;

a third decoder having an input connected to receive a bit sequence of the second predetermined length and operating on receipt of said bit sequence to generate a third decoded output, wherein the second predetermined length is half the first predetermined length;

an input buffer for holding a bit sequence of the first predetermined length and simultaneously supplying said bit sequence to the first decoder and to each of the second and third decoders;

a fourth decoder having an input connected to receive a bit sequence of said first predetermined length and operating on receipt of said bit sequence to generate a fourth decoded output, the decode unit further comprising switching circuitry responsive to the instruction mode signal to select one of the third and fourth outputs in dependence on the specified instruction mode; and a second input buffer for holding a bit sequence of the first predetermined length and for supplying said bit sequence to the fourth decoder, wherein the switching circuitry and further switching circuitry operate so that, the first and fourth decoded outputs are simultaneously selected, or the second and third decoded outputs are simultaneously selected.

17. A processor comprising:

at least one execution unit for executing instructions;

an instruction mode indicator which indicates one of a plurality of instruction modes for the processor;

a decode unit for decoding instructions prior to dispatch to the at least one execution unit; and an instruction supply mechanism for supplying instructions to the decode unit, wherein said instructions are represented by bit sequences, each bit sequence having one of a first and second predetermined length depending on an instruction mode of the plurality of the instruction modes of the processor, and wherein the decode unit comprises:

a first decoder having an input connected to receive a first bit sequence of a first predetermined length and operating on receipt of said first bit sequence to generate a first decoded output;

a second decoder having an input connected to receive a second bit sequence of a second predetermined length different from the first predetermined length and operating on receipt of said second bit sequence to generate a second decoded output;

a communication path for supplying said first bit sequence to the first decoder while simultaneously supplying said second bit sequence to the second decoder; and switching circuitry, responsive to an instruction mode signal specifying an instruction mode of the plurality of instruction modes, to select one of the first and second decoded outputs in dependence on the specified instruction mode.

18. The processor of claim 17, wherein the second bit sequence is a subset of the first bit sequence.

* * * * *